United States Patent
Li et al.

(10) Patent No.: US 10,224,004 B2
(45) Date of Patent: Mar. 5, 2019

(54) AUTOMATIC WHITE BALANCE BASED ON SURFACE REFLECTION DECOMPOSITION

(71) Applicant: MediaTek Inc., Hsinchu (TW)

(72) Inventors: Ying-Yi Li, Taipei (TW); Hsien-Che Lee, Pleasanton, CA (US)

(73) Assignee: MediaTek, Inc., Hsinchu (TW)

( * ) Notice: Subject to any disclaimer, the term of this patent is extended or adjusted under 35 U.S.C. 154(b) by 101 days.

(21) Appl. No.: 15/425,113

(22) Filed: Feb. 6, 2017

(65) Prior Publication Data
US 2018/0226054 A1   Aug. 9, 2018

(51) Int. Cl.
G09G 5/02 (2006.01)
G06T 7/90 (2017.01)
G06T 7/60 (2017.01)
G06T 7/11 (2017.01)
G06T 1/20 (2006.01)
G06T 5/00 (2006.01)

(52) U.S. Cl.
CPC .............. *G09G 5/02* (2013.01); *G06T 1/20* (2013.01); *G06T 5/00* (2013.01); *G06T 7/11* (2017.01); *G06T 7/60* (2013.01); *G06T 7/90* (2017.01); *G09G 2320/0666* (2013.01); *G09G 2320/0693* (2013.01)

(58) Field of Classification Search
CPC ............. G09G 5/02; G09G 2320/0693; G09G 2320/0666; G06T 5/00; G06T 7/11; G06T 7/60; G06T 7/90; G06T 1/20
See application file for complete search history.

(56) References Cited

U.S. PATENT DOCUMENTS

| | | | |
|---|---|---|---|
| 7,200,264 B2 | 4/2007 | Hubel et al. | |
| 8,624,996 B2 | 1/2014 | Mendez | |
| 9,007,484 B2 | 4/2015 | Zhang et al. | |
| 9,336,582 B1 | 5/2016 | Barron | |
| 2016/0105656 A1* | 4/2016 | Lin ........................ | H04N 9/735 348/223.1 |

OTHER PUBLICATIONS

Kim et al. "Automatic white balance based on adaptive feature selection with standard illuminants." Image Processing, 2008. ICIP 2008. 15th IEEE International Conference on. IEEE, 2008.*

(Continued)

*Primary Examiner* — Tapas Mazumder
(74) *Attorney, Agent, or Firm* — Tong J. Lee

(57) ABSTRACT

An automatic white balance (AWB) method is performed on an image to adjust color gains of the image. The image is pre-processed into a set of pre-processed pixels, each of which represented by tricolor values that include a red (R) value, a green (G) value and a blue (B) value. For each candidate illuminant in a set of candidate illuminants, an indicator value that has a diffuse component and a specular component is calculated. One of the candidate illuminants is identified as a resulting illuminant, for which the indicator value is the minimum indicator value among the candidate illuminants. The minimum indicator value corresponds to cancellation of the specular component. The color gains of the image is then adjusted according to color ratios derived from the resulting illuminant.

20 Claims, 8 Drawing Sheets

(56) References Cited

OTHER PUBLICATIONS

Nguyen et al. "Separation of specular and diffuse components using tensor voting in color images." Applied optics 53.33 (2014): 7924-7936.*

Nguyen et al, Separation of specular and diffuse components using tensor voting in color images, Applied Optics, vol. 53, No. 33, Nov. 20, 2014, pp. 7924-7936.

Mallick et al, Beyond Lambert: Reconstructing Specular Surfaces Using Color, IEEE Computer Society Conference on Computer Vision and Pattern Recognition, Jun. 20-25, 2005.

Lee, Illuminant color from shading, Proc. SPIE vol. 1250, Perceiving, Measuring, and Using Color (1990), pp. 236-244.

Fan et al, Deriving Reflectance and Shading Components from a Single Image, 2013 Fourth International Conference on Intelligent Control and Information Processing (ICICIP), Jun. 9-11, 2013, China.

Lee, Method for computing the scene-illuminant chromaticity from specular highlights, J. Opt. Soc. Am. A, vol. 3, No. 10, Oct. 1986, pp. 1694-1699.

Lee et al, Modeling Light Reflection for Computer Color Vision, IEEE Transactions on Pattern Analysis and Machine Intelligence, vol. 12, No. 4, Apr. 1990, pp. 402-409.

* cited by examiner

US 10,224,004 B2

AUTOMATIC WHITE BALANCE BASED ON SURFACE REFLECTION DECOMPOSITION

TECHNICAL FIELD

Embodiments of the invention relate to the fields of color photography, digital cameras, color printing, and digital color image processing.

BACKGROUND

All consumer color display devices are calibrated so that when the values of color channels Red (R)=Green (G)=Blue (B), the color is displayed at a standard "white point" chromaticity, mostly D65 or D50 according to the International Commission on Illumination (abbreviated as CIE) standard. Digital color cameras using complementary metal-oxide semiconductor (CMOS) or charge-coupled device (CCD) sensors have different sensitivities for RGB channels, resulting in raw images with some color cast (e.g., greenish). Furthermore, the color of an object varies as a function of the color of the light source (e.g., tungsten light or daylight), and the mutual reflection from ambient objects. Therefore, it is often necessary to adjust the "white point" of a raw image before one can process and display the image in proper color reproduction. This white point adjustment is called white balance (WB), and it is typically performed by applying proper gains to the color channels so that neutral objects (such as black, gray, and white) in the image are rendered with approximately equal R, G, B values. In digital cameras, the white point can be manually or automatically adjusted. Automatic white balance (AWB) is thus an important operation in color imaging applications.

Most conventional AWB algorithms rely on some physical features (such as the color gamut) and statistical properties (such as the average color distribution) of natural scenes. The conventional AWB algorithms, which are sensitive to the statistics of the scene contents, often encounter one or more of the following difficulties: 1) a dominant color biases the results, 2) the estimate has a high probability to be wrong when there is no neutral color in the image, 3) inaccurate camera calibration can cause the scene statistics to be different from the statistics used by the camera, 4) a large set of training samples with ground truth may be required to build up reliable statistics, and 5) the algorithm performance may be affected by unit-to-unit variations in the mass production of cameras. Therefore, it is highly desirable to develop AWB techniques that are more robust and relatively insensitive to scene contents.

SUMMARY

In one embodiment, a method is provided for performing automatic white balance on an image. The method comprises: pre-processing the image to obtain a plurality of pre-processed pixels, each of which represented by tricolor values that include a red (R) value, a green (G) value and a blue (B) value; calculating, for each candidate illuminant in a set of candidate illuminants, an indicator value that has a diffuse component and a specular component; identifying one of the candidate illuminants as a resulting illuminant for which the indicator value is a minimum indicator value among the candidate illuminants, wherein the minimum indicator value corresponds to cancellation of the specular component; and adjusting color gains of the image according to color ratios derived from the resulting illuminant.

In another embodiment, a device is provided performing automatic white balance on an image. The device comprises: a memory to store the image; and an image processing pipeline coupled to the memory. The image processing pipeline is operative to: pre-process the image to obtain a plurality of pre-processed pixels, each of which represented by tricolor values that include a red (R) value, a green (G) value and a blue (B) value; calculate, for each candidate illuminant in a set of candidate illuminants, an indicator value that has a diffuse component and a specular component; identify one of the candidate illuminants as a resulting illuminant for which the indicator value is a minimum indicator value among the candidate illuminants, wherein the minimum indicator value corresponds to cancellation of the specular component; and adjust color gains of the image according to color ratios derived from the resulting illuminant. The device further comprises a display coupled to the image processing pipeline to display the image with the adjusted color gains.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Systems and methods based on surface reflection decomposition are provided for performing automatic white balance (AWB). The systems and methods are robust and relatively insensitive to scene contents when compared with those based on conventional AWB algorithms. The systems and methods do not rely on detailed scene statistics or a large image database for training. In the following, a minimum projected area (MPA) method and a minimum total variation (MTV) method are described, both based on decomposing the surface reflection into a specular component and a diffuse component, and on the cancellation of the specular component.

As used herein, the term "tricolor values," or equivalently "RGB values" or "RGB channels," refers to the three color values (red, green, blue) of a color image. The terms "illuminant" and "light source" are used interchangeably. Furthermore, a chroma image refers to a color difference image, which can be computed from taking the difference between one color channel and another color channel, or the difference between linear combinations of color channels.

Figure 1A:
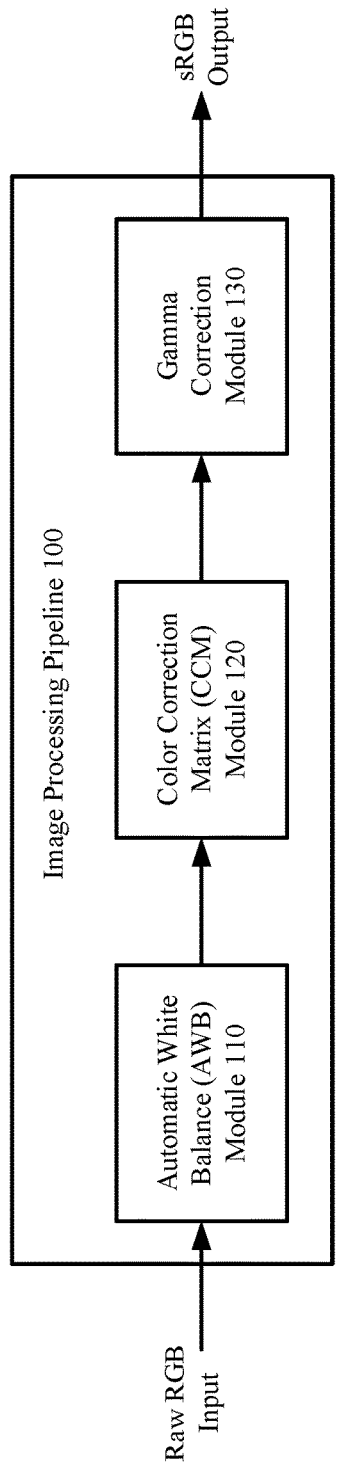
FIG. 1A illustrates an image processing pipeline for color correction according to one embodiment.

FIG. 1A illustrates an example of an image processing pipeline 100 that performs color correction according to one embodiment. The image processing pipeline 100 includes an AWB module 110, which receives raw RGB values as input, and outputs white-balance corrected RGB values. The raw RGB values may be generated by an image sensor, a camera, a video recorder, etc. The operations of the AWB module 110 will be explained in detail with reference to FIGS. 2-10. The image processing pipeline 100 further includes a color correction matrix (CCM) module 120, which performs 3×3 matrix operations on the RGB values output from the AWB module 110. The CCM module 120 can reduce the difference between the spectral characteristics of the image sensor and the spectral response of a standardized color device" (e.g., an sRGB color display). The image processing pipeline 100 may further include a gamma correction module 130, which applies a nonlinear function on the RGB values output from the CCM module 120 to compensate the non-linear luminance effect of display devices. The output of the image processing pipeline 100 is a collection of standard RGB (sRGB) values ready to be displayed.

Figure 1B:
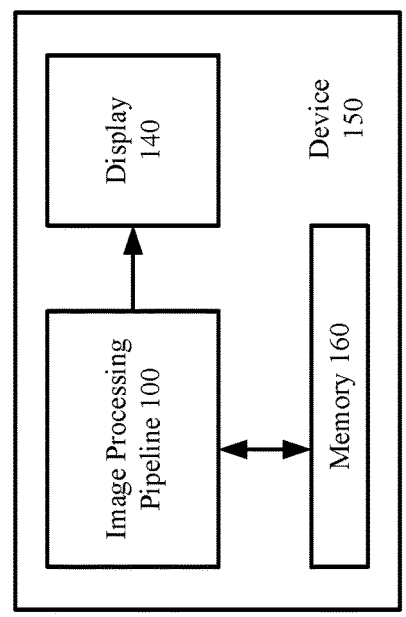
FIG. 1B illustrates a device that includes the image processing pipeline of FIG. 1A according to one embodiment.

FIG. 1B illustrates a system in the form of a device 150 that includes the image processing pipeline 100 of FIG. 1A according to one embodiment. In addition to the image processing pipeline 100, the device 150 includes a memory 160 for storing image data or intermediate image data to be processed by the image processing pipeline 100, and a display 140 for displaying an image with sRGB values. It is understood that the device 150 may include additional components, including but not limited to: image sensors, one or more processors, user interface, network interface, etc. In one embodiment, the device 150 may be a digital camera; alternatively, the device 150 may be part of a computing and/or communication device, such as a computer, laptop, smartphone, smart watch, etc.

Before describing the embodiments of the AWB module 110, it is helpful to first explain the principles according to which the AWB module 110 operates.

Let $f(\theta; \lambda)$ be the bidirectional spectral reflectance distribution function (BSRDF), where $\theta$ represents all angle-dependent factors and $\lambda$ the wavelength of light. The BSRDF of most colored object surfaces can be described as a combination of two reflection components, an interface reflection (specular) component and a body reflection (diffuse) component. The interface reflection is often non-selective, i.e., it reflects light of all visible wavelength equally well. This model is called the neutral interface reflection (NIR) model. Based on the NIR model, the BSRDF $f(\theta; \lambda)$ can be expressed as:

$$f(\theta;\lambda)=\rho(\lambda)h(\theta)+\rho_s k(\theta), \tag{1}$$

where $\rho(\lambda)$ is the diffuse reflectance factor, $\rho_s$ is the specular reflectance factor, and $h(\theta)$ and $k(\theta)$ are the angular dependence of the reflectance factors. A key feature of the NIR model is that the spectral factor and the geometrical factor in each reflection component are completely separable.

Assume that $L(\lambda)$ is the spectral power distribution of the illuminant, and $S_r(\lambda)$, $S_g(\lambda)$, and $S_b(\lambda)$ are the three sensor fundamentals (i.e., spectral responsivity functions). The RGB color space can be derived as:

$$R = \int L(\lambda)f(\theta;\lambda)S_r(\lambda)d\lambda \tag{2}$$

$$= h(\theta)\int L(\lambda)\rho(\lambda)S_r(\lambda)d\lambda + \rho_s k(\theta)\int L(\lambda)S_r(\lambda)d\lambda,$$

$$G = h(\theta)\int L(\lambda)\rho(\lambda)S_g(\lambda)d\lambda + \rho_s k(\theta)\int L(\lambda)S_g(\lambda)d\lambda,$$

$$B = h(\theta)\int L(\lambda)\rho(\lambda)S_b(\lambda)d\lambda + \rho_s k(\theta)\int L(\lambda)S_b(\lambda)d\lambda.$$

Let $$L_r = \int L(\lambda)S_r(\lambda)d\lambda,$$

$$L_g = \int L(\lambda)S_g(\lambda)d\lambda,$$

$$L_b = \int L(\lambda)S_b(\lambda)d\lambda,$$

$$\rho_r = \frac{\int L(\lambda)\rho(\lambda)S_r(\lambda)d\lambda}{\int L(\lambda)S_r(\lambda)d\lambda},$$

$$\rho_g = \frac{\int L(\lambda)\rho(\lambda)S_g(\lambda)d\lambda}{\int L(\lambda)S_g(\lambda)d\lambda},$$

$$\rho_b = \frac{\int L(\lambda)\rho(\lambda)S_b(\lambda)d\lambda}{\int L(\lambda)S_b(\lambda)d\lambda}.$$

Then, $$R=L_r[\rho_r h(\theta)+\beta_s k(\theta)],$$

$$G=L_g[\rho_g h(\theta)+\rho_s k(\theta)],$$

$$B=L_b[\rho_b h(\theta)\rho_s k(\theta)], \tag{3}$$

where $L_r$, $L_g$, and $L_b$ are the tristimulus values of the light source. The RGB color space can be re-written in matrix form as:

$$\begin{bmatrix} R \\ G \\ B \end{bmatrix} = h(\theta)\begin{bmatrix} L_r & 0 & 0 \\ 0 & L_g & 0 \\ 0 & 0 & L_b \end{bmatrix}\begin{bmatrix} \rho_r \\ \rho_g \\ \rho_b \end{bmatrix} + \rho_s k(\theta)\begin{bmatrix} L_r \\ L_g \\ L_b \end{bmatrix}. \tag{4}$$

Let $v_1$ and $v_2$ be two independent vectors in the RGB space. If the RGB values are projected on plane V spanned by $v_1$ and $v_2$, the projected coordinates will be:

$$[v_1 \; v_2]^T \begin{bmatrix} R \\ G \\ B \end{bmatrix} = h(\theta)[v_1 \; v_2]^T \begin{bmatrix} L_r & 0 & 0 \\ 0 & L_g & 0 \\ 0 & 0 & L_b \end{bmatrix} \begin{bmatrix} \rho_r \\ \rho_g \\ \rho_b \end{bmatrix} + \rho_s k(\theta)[v_1 \; v_2]^T \begin{bmatrix} L_r \\ L_g \\ L_b \end{bmatrix}. \quad (5)$$

Let $L=[L_r \; L_g \; L_b]^T$ be the light source vector. The second term in equation (5) disappears when $[v_1 \; v_2]^T L = 0$. It means that when plane V is perpendicular to the light source vector L, the specular component is canceled.

Figure 2:
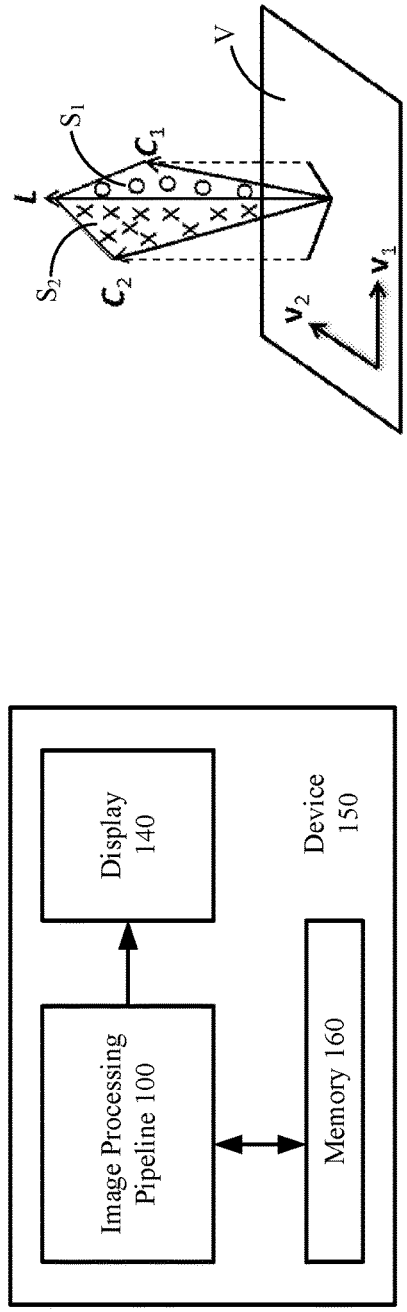
FIG. 2 illustrates the projection of two color surfaces on a plane that is perpendicular to a light source vector.

FIG. 2 illustrates an example of projecting the colors of two surfaces on the plane V. According to the NIR model, every color vector of light reflected from a given surface (e.g., $S_1$) is a linear combination of the specular component (represented by the light source vector L) and the diffuse component (represented by $C_1$). All the colors of $S_1$ are on the same plane as L and $C_1$. Similarly, all the colors of another surface (e.g., $S_2$) are on the same plane as L and $C_2$. Therefore, all the colors under the same light source are on the planes that share a common vector L. If all the colors are projected along the light source vector L, their projections will form several lines and those lines intersect at one point which is the projected point of the light source vector. If the projection direction is not along the light source vector L (i.e., if V is not perpendicular to L), then the specular component is not canceled. In this case, the projected colors will no longer form lines on plane V, but instead will spread out over two-dimensional area of plane V. This two-dimensional area, referred to as the projected area on Plane V, can be calculated when $v_1$ and $v_2$ are orthonormal. Plane V varies when $v_1$ and $v_2$ change. By changing $v_1$ and $v_2$, the projected area will become the smallest when plane V is perpendicular to the light source vector L. It does not matter which specific $v_1$ and $v_2$ are used as the basis vectors, as all of them produce substantially the same results.

In the AWB calculations, the light source vector L for the ground truth light source is unknown. The MPA method varies plane V by choosing different candidate illuminants. From the chosen light source vector $L=(L_r, L_g, L_b)$ of the candidate illuminant, the orthonormal basis vectors $v_1$ and $v_2$ can be computed, and a given image's projected area on the plane spanned by $v_1$ and $v_2$ can also be computed. The projected area is the smallest when the chosen light source vector L is the closest to the ground truth light source of the image.

In one embodiment, the orthonormal basis vectors may be parameterized as follows:

$$v_1(\alpha, \beta) = \frac{1}{\sqrt{\alpha^2 + 1}}[\alpha \; -1 \; 0]^T, \quad (6)$$

$$v_2(\alpha, \beta) = \frac{1}{\sqrt{\alpha^2 + \alpha^4 + \beta^2(\alpha^2 + 1)^2}}[-\alpha \; -\alpha^2 \; \beta(\alpha^2 + 1)]^T. \quad (7)$$

When $\alpha = L_g/L_r$ and $\beta = L_g/L_b$, plane $V(\alpha, \beta)$ is perpendicular to L.

In one embodiment, the search range for the light sources is narrowed to a subspace where light sources are more likely to occur, since searching through all possible planes $V(\alpha, \beta)$ is very time consuming. Narrowing the search range also has the benefit of reducing the possibility of finding the wrong light source. In one embodiment, the search range can be a set of illuminants commonly occurred in consumer images of the intended application domain. The term "consumer images" refers to color images that are typically seen on image display devices used by content consumers. Alternatively or additionally, a suitable blending of the daylight locus and the blackbody radiator locus may be used. This blending can provide a light locus covering most illuminants in the consumer images. To search for the light source of an image, the MPA method calculates the image's projected area for each candidate illuminant in a set of candidate illuminants along the light locus. The candidate illuminant that produces the minimum projected area is the best estimate of the scene illuminant (i.e., the ground truth light source), and the image is white balanced according to that scene illuminant. In one embodiment, the MPA method minimizes the following expression:

$$\arg\min_{\alpha, \beta} w(\alpha, \beta) \text{Area}(\alpha, \beta), \quad (8)$$

where $w(\alpha, \beta)$ is a bias function, and Area$(\alpha, \beta)$ is the projected area on plane $V(\alpha, \beta)$, which is spanned by $v_1(\alpha, \beta)$ and $v_2(\alpha, \beta)$. The bias function may be used to modify a projected area and thus improve the performance of the MPA method. The bias function relies on the gross scene illuminant distribution, but not the scene content. Therefore, the same bias function can work for any camera model after the camera is calibrated. Details of the bias function $w(\alpha, \beta)$ will be provided later. In alternative embodiments, the bias function may be omitted (i.e., set to one).

Figure 3:
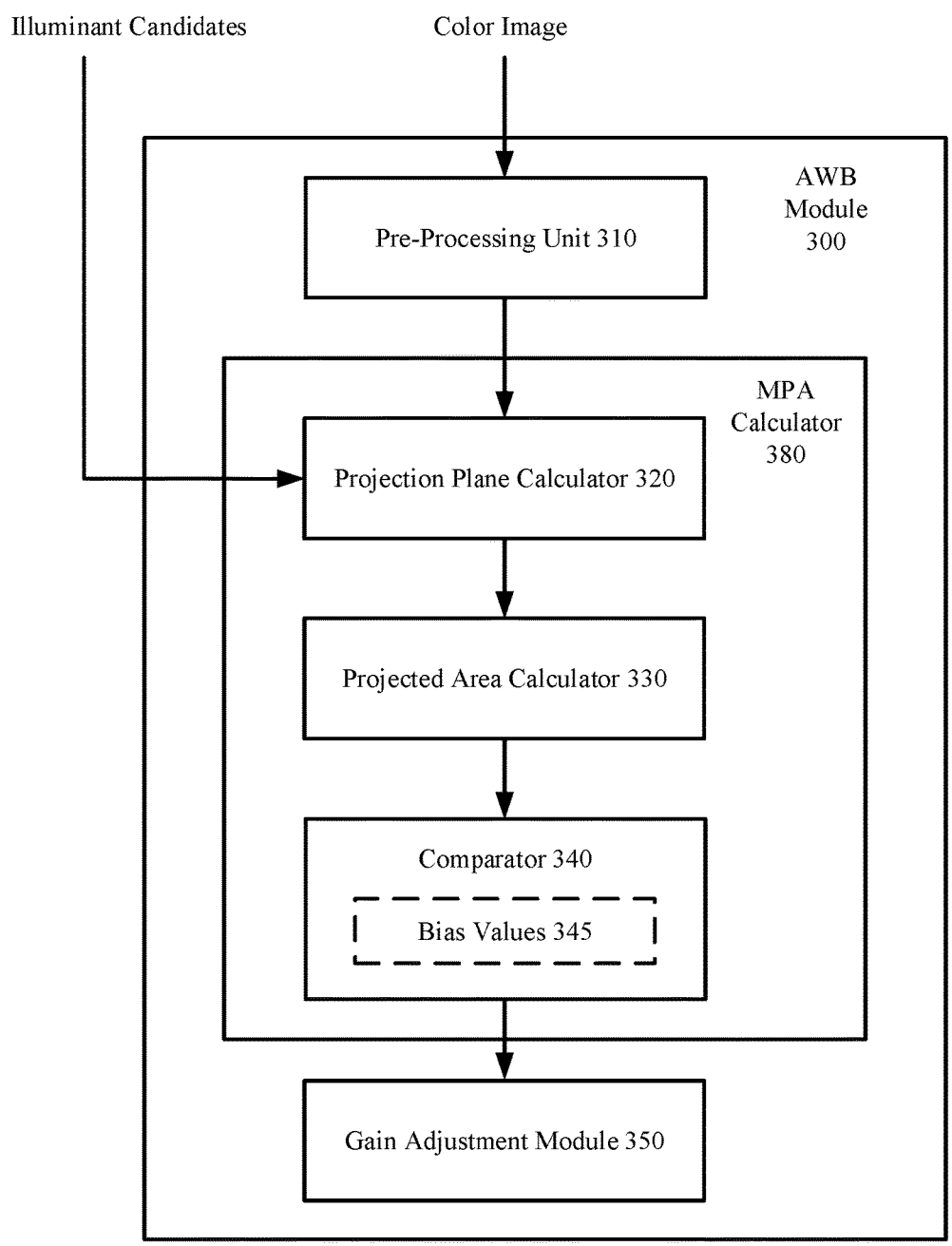
FIG. 3 is a diagram illustrating an automatic white balance module that performs a minimum projected area (MPA) method according to one embodiment.

FIG. 3 illustrates an AWB module 300 for performing the MPA method according to one embodiment. The AWB module 300 is an example of the AWB module 110 of FIG. 1A. The AWB module 300 includes a pre-processing unit 310, which processes raw RGB data of an input image to remove over-exposed, under-exposed and saturated pixels. The removal of these pixels can speed up AWB computation and reduce noise. In one embodiment, a pixel is deemed over-exposed and removed if one or more of its R value, G value and B value is within a predetermined vicinity from the maximum of that pixel's color data range; in other words, when one or more of the pixel's color channels is greater than a threshold. After these pixels are removed, the pre-processing unit 310 may group-average the input image by dividing the image into multiple groups of neighboring pixels, and calculating a weighted average of the tricolor values of the neighboring pixels in each group. The weight for each group may be one or another number. In one embodiment, after the calculating the group average, the pre-processing unit 310 may remove under-exposed pixels from the image. A pixel is over-exposed if the sum of its R value, G value and B value is above a first threshold; a pixel is under-exposed if the sum of its R value, G value and B value is below a second threshold. The pre-processing unit 310 may also remove saturated pixels from the image. A pixel is saturated if one of its R value, G value and B value is below a predetermined threshold.

In one embodiment, after the pixel removal and group averaging operations, the pre-processing unit 310 may subsample the image to produce a pre-processed image. The pre-processed image is fed into an MPA calculator 380 in the AWB module 300 for MPA calculations.

In one embodiment, the MPA calculator 380 includes a projection plane calculator 320 and a projected area calculator 330. The projection plane calculator 320 calculates two orthonormal vectors $v_1$ and $v_2$ that span a plane perpendicular to a light source vector $(L_r, L_g, L_b)$ of a candidate illuminant. In one embodiment, the projection plane calculator 320 calculates $v_1$ and $v_2$ according to equations (6) and (7), where $\alpha$ and $\beta$ are given or calculated from a candidate illuminant.

Figure 4A:
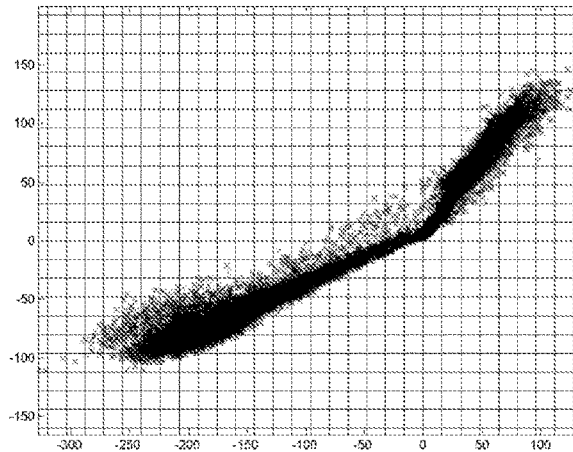
FIGS. 4A, 4B and 4C illustrate examples of projection results using three different candidate illuminants.
Figure 4B:
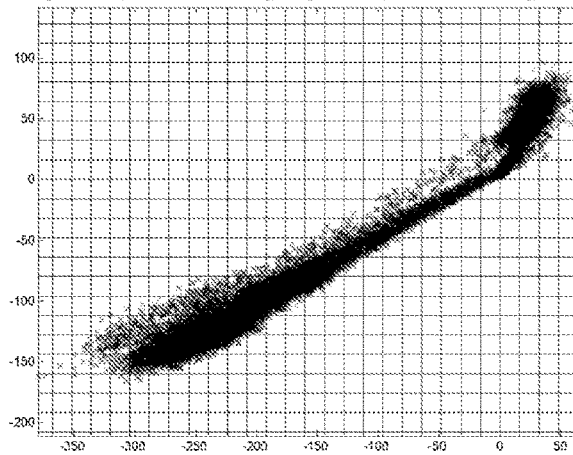
Figure 4C:
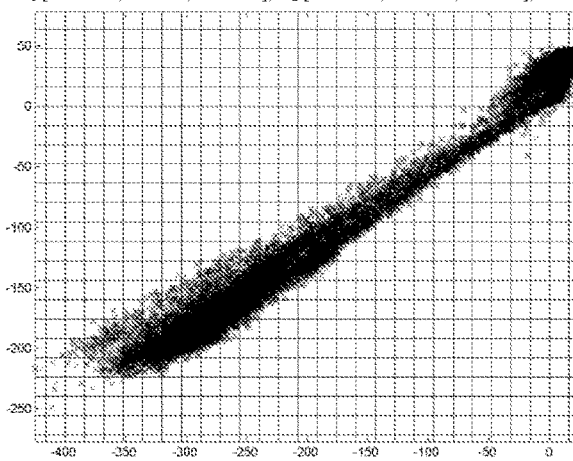

After the projection plane is determined, the projected area calculator 330 projects the RGB values of each pixel in the pre-processed image to that projection plane. The result of the projection is a collection of points that fall onto the projection plane. If each color is represented as an ideal point, then the result of the projection will produce a set of scattered dots on the projected plane, as shown in the examples of FIGS. 4A, 4B and 4C, each of which illustrates a projection result using a different candidate illuminant. The local dot density becomes higher when the projection is along the ground truth light source vector. However, computing dot density requires a large amount of computations. In one embodiment, the projection plane is divided into a set of spatial bins (e.g., squares). A square is counted when one or more pixels are projected into that square. The total number of counted squares may be used as an estimate of the projected area.

Referring to FIGS. 4A, 4B and 4C, in each example, the 'x' marks represent the projection points of all pixels of the image. When the candidate illuminant is closer to the ground truth, the total projected area marked by 'x's becomes smaller. Each example uses a different candidate illuminant described by the orthonormal bases $v_1$ and $v_2$. The candidate illuminant that produces the minimum projected area of 119 in FIG. 4B has the smallest area, and is therefore the closest to the ground truth among the three candidate illuminants.

Referring again to FIG. 3, after the projected area calculator 330 calculates the projected areas for a set of different candidate illuminants, a comparator 340 compares the projected areas and identifies a candidate illuminant that produces the minimum projected area. In one embodiment, as an option to improve the AWB results, the comparator 340 may multiply each projected area with the aforementioned bias function, shown herein as a bias value 345 (i.e., a weight), before the comparison. The bias values 345 may be determined based on prior knowledge about how frequently an illuminant along the light locus may occur in consumer images. That is, the bias values 345 represent the prior knowledge of scene illuminant distribution, and are not related to scene contents. In one embodiment, each candidate illuminant is associated with a bias value, which may be denoted as a function $w(\alpha, \beta)$, where $\alpha$ and $\beta$ are color ratios of the candidate illuminant. The bias values are stable from one camera model to another camera model.

After the comparator 340 identifies a candidate illuminant that produces the minimum projected area, a gain adjustment unit 350 adjusts the color gain of the input image according to the color ratios $\alpha$ and $\beta$ of the candidate illuminant.

For an image with multiple different colored objects, the projected area is often minimized when the projection is along the light source vector. However, for images of a single dominant color, the minimum projected area can occur when either the specular component or the diffuse component of the dominant color is canceled. In order to better handle such images of few colors, the search is constrained to the minimum projected area caused by the cancellation of the specular component, not by the diffuse component of the dominant color. One way is to search for the candidates which are close to where the potential light sources are located in the chromaticity space. Therefore, the minimum projected area is searched along the light locus which goes through the population of the known light sources.

In one embodiment, a chromaticity coordinate system (p, q) may be used to parameterize the distribution of light locus in the chromaticity domain with reduced distortion. The coordinate system (p, q) is defined as:

$$p = \frac{1}{\sqrt{2}} r - \frac{1}{\sqrt{2}} b, \tag{9}$$

$$q = -\frac{1}{\sqrt{6}} r + \frac{2}{\sqrt{g}} g - \frac{1}{\sqrt{6}} b,$$

where $r=R/(R+G+B)$, $g=G/(R+G+B)$, and $b=B/(R+G+B)$.

For a candidate illuminant $(L_r, L_g, L_b)$, its (p, q) coordinates can be determined by replacing R, G, B values in equations (9) with the $L_r$, $L_g$, $L_b$ values.

A light locus may be obtained by fitting the color data taken by a reference camera under different illuminants. For example, a curve fitting from three types of light sources: shade, daylight, and tungsten can provide a very good light locus. In one embodiment, a given light locus may be represented by a second-order polynomial function in the (p, q) domain having the form of:

$$q = a_1 p^2 + a_2 p + a_3. \tag{10}$$

Given (p, q), the following equations calculate (r, g, b):

$$r = \frac{1}{\sqrt{2}} p - \frac{1}{\sqrt{6}} q + \frac{1}{3}, \tag{11}$$

$$g = \frac{\sqrt{6}}{3} q + \frac{1}{3},$$

$$b = -\frac{1}{\sqrt{2}} p - \frac{1}{\sqrt{6}} q + \frac{1}{3}.$$

The color ratios $\alpha$ and $\beta$ can be obtained by:

$$\alpha = \frac{g}{r}, \beta = \frac{g}{b}. \tag{12}$$

Accordingly, given a (p, q) along the light locus, the color ratios $\alpha$ and $\beta$ can be computed. Using equations (6) and (7), the orthonormal vectors $v_1(\alpha, \beta)$ and $v_2(\alpha, \beta)$ can be computed, and the projected area of an image on plane V spanned by $v_1(\alpha, \beta)$ and $v_2(\alpha, \beta)$ can also be computed.

When a scene is illuminated by a single dominant light source, the MPA method can estimate the light source accurately. However, some scenes have more than one light source. In one embodiment, a block MPA method is used to handle such multiple-illuminant scenarios. With the block MPA method, an image is divided into several blocks and the MPA method is applied to each block.

Figure 5:
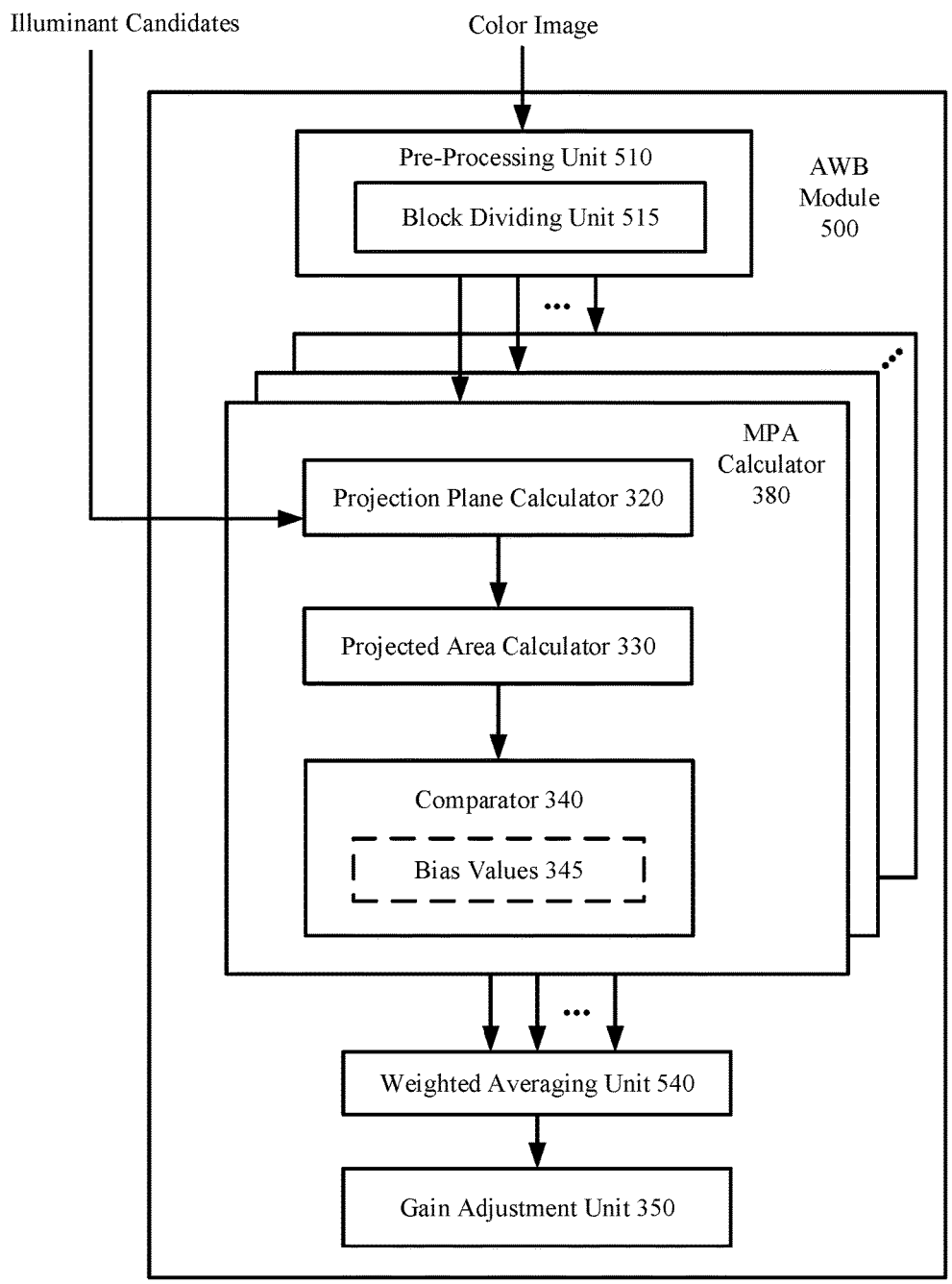
FIG. 5 is a diagram illustrating an automatic white balance module that performs a block MPA method according to one embodiment.

FIG. 5 illustrates an AWB module 500 for performing the block MPA method according to one embodiment. The AWB module 500 is an example of the AWB module 110 of FIG.

1A. The AWB module 500 includes a pre-processing unit 510, which further includes a block dividing unit 515 to divide an input image into multiple blocks. The pre-processing unit 510 performs the same pixel removal operations as the pre-processing unit 310 of FIG. 3 on each block to remove over-exposed, under-exposed and saturated pixels. The pre-processing unit 510 also determines whether each block has a sufficient number of pixels (e.g., 10 pixels) for the MPA method after the pixel removal operations. If less than a threshold number of blocks (e.g., half of the number of blocks) have sufficient number of pixels for the MPA method, the pre-processing unit 510 re-divides the image into fewer number of blocks, such that the number of new blocks in the image is greater than the threshold number.

In one embodiment, the AWB module 500 includes one or more MPA calculators 310 to execute the MPA method on each block. The per-block results are gathered by an weighted averaging unit 540, which averages the chromaticity coordinate p first, then finds the other chromaticity coordinate q based on the fitted curve (e.g., the second-order polynomial function in (10)) for a given light locus. In one embodiment, the weighted averaging unit 540 applies a weight to each block; for example, the weight of a block having the main object may be higher than other blocks. In alternative embodiment, the weighted averaging unit 540 may apply the same weight to all blocks. The output of the weighted averaging unit 540 is a resulting candidate illuminant or a representation thereof. The gain adjustment unit 350 then adjusts the color gain of the input image using the color ratios α and β of the resulting candidate illuminant.

Figure 6:
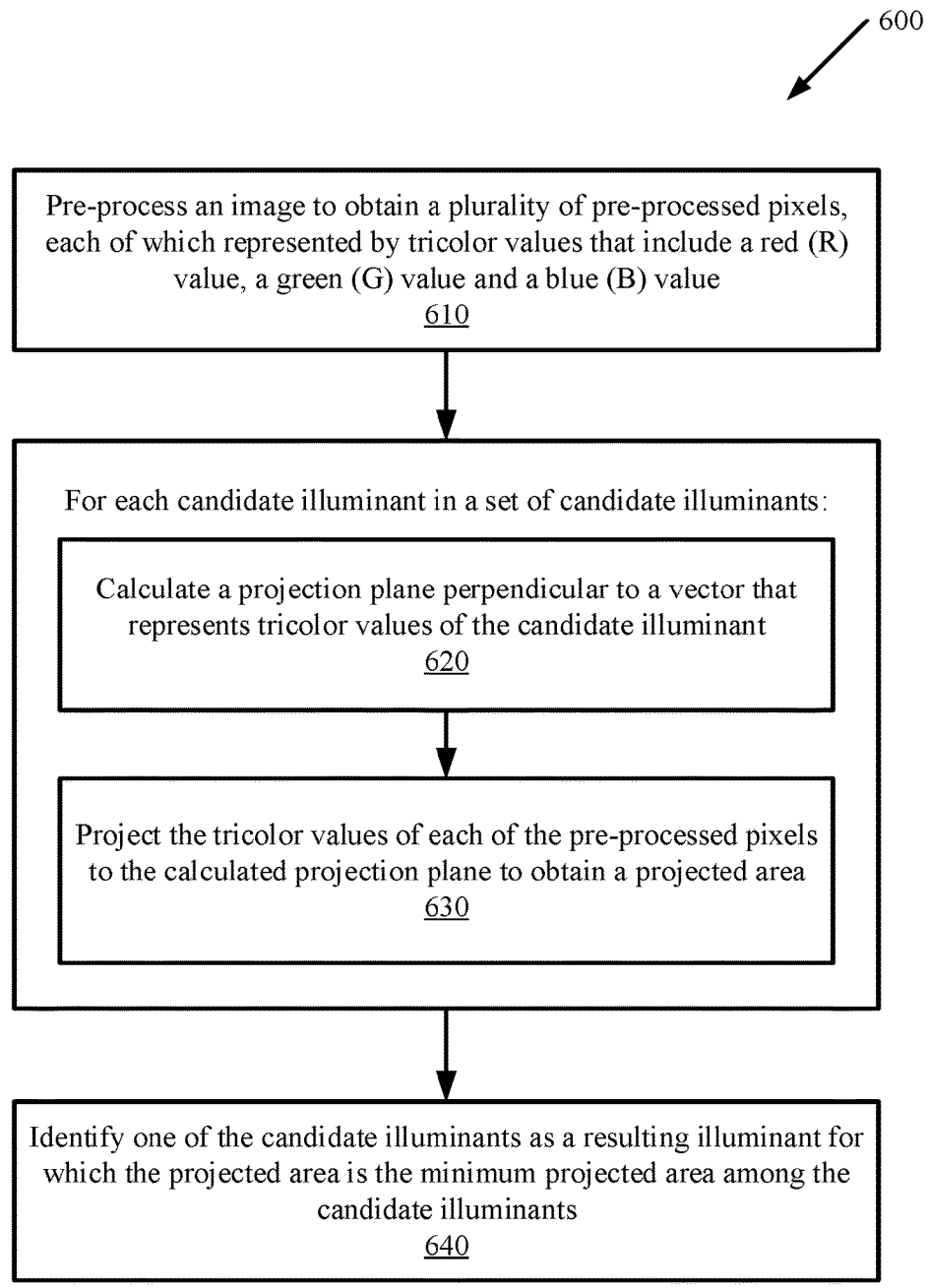
FIG. 6 is a flow diagram illustrating a MPA method according to one embodiment.

FIG. 6 is a flow diagram illustrating a MPA method 600 performed on a color image according to one embodiment. The MPA method 600 may be performed by a device, such as the device 150 of FIG. 1B; more specifically, the MPA method 600 may be performed by the AWB module 110 of FIG. 1A, the AWB module 300 of FIG. 3 and/or the AWB module 500 of FIG. 5.

The MPA method 600 begins with a device pre-processing an image to obtain pre-processed pixels, each of which represented by tricolor values that include a red (R) value, a green (G) value and a blue (B) value (step 610). For each candidate illuminant in a set of candidate illuminants, the device performs the following operations: calculating a projection plane perpendicular to a vector that represents tricolor values of the candidate illuminant (step 620), and projecting the tricolor values of each of the pre-processed pixels to the calculated projection plane to obtain a projected area (step 630). One of the candidate illuminants is identified as a resulting illuminant for which the projected area is the minimum projected area among the candidate illuminants (step 640). The device may use the color ratios of the resulting illuminant to adjust the color gains of the image.

According to another embodiment, AWB may be performed using the MTV method, which is also based on the same principle as the MPA method by seeking to cancel the specular component. According to the NIR model, a pair of chroma images, $(\alpha C_1 - C_2)$ and $(\beta C_3 - C_2)$, can be created from a given image by scaling one color channel and taking the difference with another color channel. $(C_1, C_2, C_3)$ is the linear transformation of tricolor values $(R,G,B)$.

$$\begin{bmatrix} C_1 \\ C_2 \\ C_3 \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix} \quad (13)$$

Both $(\alpha C_1 - C_2)$ and $(\beta C_3 - C_2)$ are functions of spatial locations in the image. The two chroma images can be expressed as:

$$(\alpha C_1 - C_2) = \qquad (14)$$
$$[(\alpha a_{11} - a_{21})L_r\rho_r + (\alpha a_{12} - a_{22})L_g\rho_g + (\alpha a_{13} - a_{23})L_b\rho_b]h(\theta) +$$
$$[(\alpha a_{11} - a_{21})L_r + (\alpha a_{12} - a_{22})L_g + (\alpha a_{13} - a_{23})L_b]\rho_s k(\theta),$$
$$(\beta C_3 - C_2) = [(\beta a_{31} - a_{21})L_r\rho_r + (\beta a_{32} - a_{22})L_g\rho_g +$$
$$(\beta a_{33} - a_{23})L_b\rho_b]h(\theta) +$$
$$[(\beta a_{31} - a_{21})L_r + (\beta a_{32} - a_{22})L_g + (\beta a_{33} - a_{23})L_b]\rho_s k(\theta).$$

When $\alpha = (a_{21}L_r + a_{22}L_g + a_{23}L_b)/(a_{11}L_r + a_{12}L_g + a_{13}L_b)$ and $\beta = (a_{21}L_r + a_{22}L_g + a_{23}L_b)/(a_{31}L_r + a_{32}L_g + a_{33}L_b)$:

$$(\alpha C_1 - C_2) = [(\alpha a_{11} - a_{21})L_r\rho_r + (\alpha a_{12} - a_{22})L_g\rho_g + (\alpha a_{13} - a_{23})L_b\rho_b]h(\theta),$$

$$(\beta C_3 - C_2) = [(\beta a_{31} - a_{21})L_r\rho_r + (\beta a_{32} - a_{22})L_g\rho_g + (\beta a_{33} - a_{23})L_b\rho_b]h(\theta). \qquad (15)$$

The specular component is canceled for both $\alpha C_1 - C_2$ and $\beta C_3 - C_2$. When the cancellation happens, the total variation of $\alpha C_1 - C_2$ and $\beta C_3 - C_2$ is greatly reduced because the modulation due to the specular components is gone. There is left only a signal modulation entirely due to the difference in the diffuse components.

By searching along a given light locus, the MTV method finds a candidate illuminant, represented by color ratios α and β, that minimizes the following expression of total variation. The color ratios α and β may be computed from a given point (p, q) on a given light locus using equations (11) and (12). The total variation in this embodiment can be expressed as a sum of absolute gradient magnitudes of the two chroma images in (14):

$$\operatorname*{argmin}_{\alpha,\beta} \sum_n |\nabla(\alpha C_1(n) - C_2(n))| + |\nabla(\beta C_3(n) - C_2(n))|. \qquad (16)$$

It is noted that the gradient of a two-dimensional image is a vector that has an x-component and a y-component. For computational efficiency, a simplified one-dimensional approximation of total variation can be used:

$$\operatorname*{argmin}_{\alpha,\beta} \sum_n |\alpha[C_1(n) - C_1(n+1)] - [C_2(n) - C_2(n+1)]| + \qquad (17)$$
$$|\beta[C_3(n) - C_3(n+1)] - [C_2(n) - C_2(n+1)]|$$

In one embodiment, if any neighboring pixel has been removed due to over-exposure, under-exposure, or color saturation, the gradient of that pixel is excluded from the total variation calculation.

Figure 7:
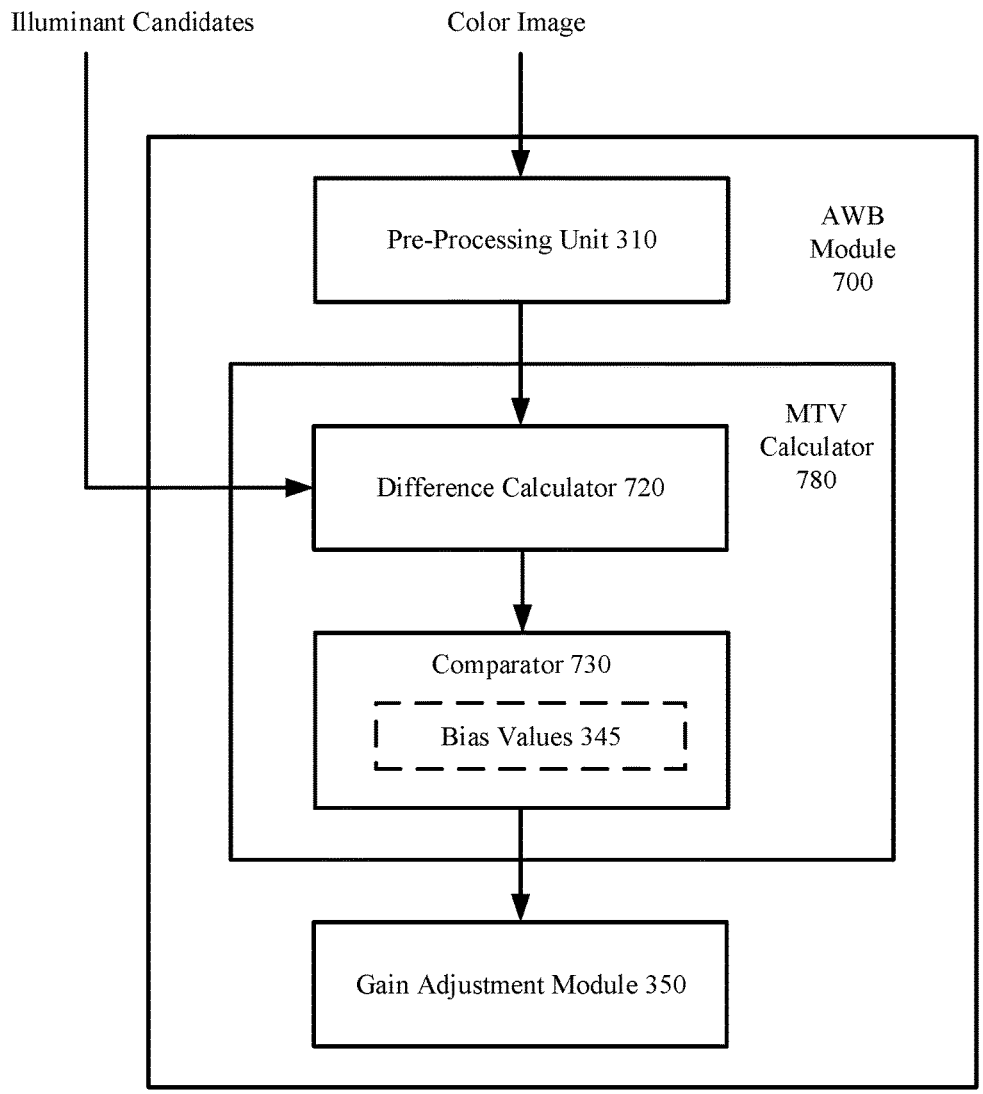
FIG. 7 is a block diagram illustrating an automatic white balance module that performs a minimum total variation (MTV) method according to one embodiment.

FIG. 7 illustrates an AWB module 700 for performing the MTV method according to one embodiment. The AWB module 700 is another example of the AWB module 110 of FIG. 1A. The AWB module 700 includes the pre-processing unit 310, which processes raw RGB data of an input image to remove over-exposed, under-exposed and saturated pixels. The AWB module 700 further includes an MTV calculator 780, which searches for a minimum total variation solution in a set of candidate illuminants. More specifically, the MTV calculator 780 further includes a difference calculator 720 and a comparator 730. The difference calculator 720 calculates the total variation for each candidate illuminant, and the comparator 730 compares the results from the difference calculator 720 to identify a minimum total variation. In one embodiment, the comparator 730 may multiply each total variation with a bias value 345 (i.e., a weight) before the comparison. The bias values 345 may be determined based on prior knowledge about how frequently an illuminant along the light locus may occur in consumer images. That is, the bias values 345 represent the prior knowledge of scene illuminant distribution, and are not related to scene contents. In one embodiment, each candidate illuminant is associated with a bias value, which may be denoted as a function $w(\alpha, \beta)$, where $\alpha$ and $\beta$ are color ratios of the candidate illuminant The bias values are stable from one camera model to another camera model.

After the comparator 730 identifies the candidate illuminant that produces the minimum total variation, the gain adjustment unit 350 adjusts the color gain of the input image using the color ratios $\alpha$ and $\beta$ of the candidate illuminant. Experiment results show that the MTV method performs well for a single dominant illuminant as well as multiple illuminants.

Figure 8:
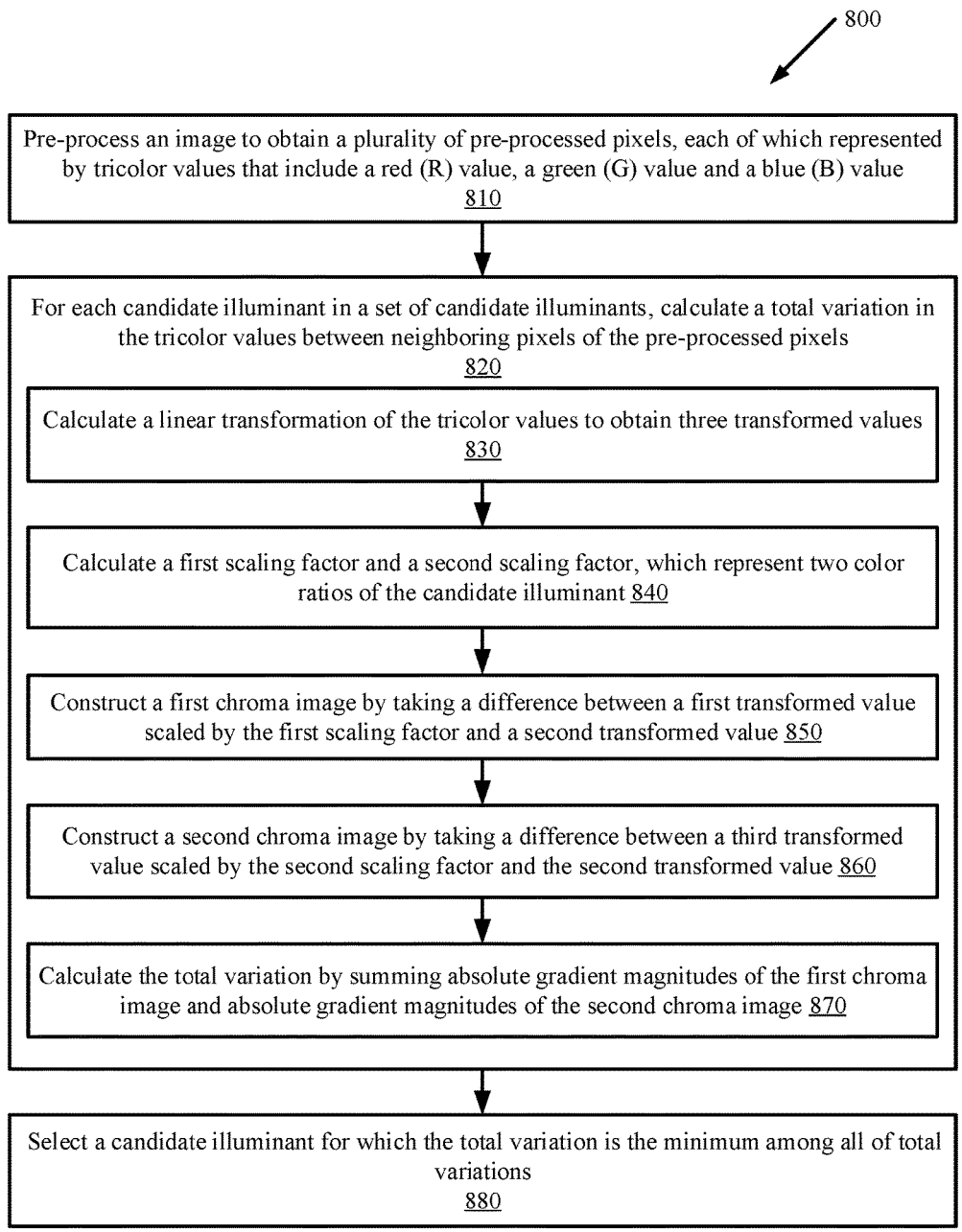
FIG. 8 is a flow diagram illustrating a MTV method according to one embodiment.

FIG. 8 is a flow diagram illustrating a MTV method 800 performed on a color image according to an alternative embodiment. In this alternative embodiment, a linear transformation is applied to the tricolor values in the calculation of the total variation. The MTV method 800 may be performed by a device, such as the device 150 of FIG. 1B; more specifically, the MTV method 800 may be performed by the AWB module 110 of FIG. 1A and/or the AWB module 700 of FIG. 7.

The MTV method 800 begins with a device pre-processing an image to obtain a plurality of pre-processed pixels, each of which represented by tricolor values that include a red (R) value, a green (G) value and a blue (B) value (step 810). For each candidate illuminant in a set of candidate illuminants, the device calculates a total variation in the tricolor values between neighboring pixels of the pre-processed pixels (step 820). The calculation of the total variation includes the operations of: calculating a linear transformation of the tricolor values to obtain three transformed values (step 830); calculating a first scaling factor and a second scaling factor, which represent two color ratios of the candidate illuminant (step 840); constructing a first chroma image by taking a difference between a first transformed value scaled by the first scaling factor and a second transformed value (step 850); constructing a second chroma image by taking a difference between a third transformed value scaled by the second scaling factor and the second transformed value (step 860); and calculating an indicator value by summing absolute gradient magnitudes of the first chroma image and absolute gradient magnitudes of the second chroma image (step 870). After the total variations of all candidate illuminants are computed, the device selects a candidate illuminant for which the total variation is the minimum among all of total variations (step 880).

Figure 9:
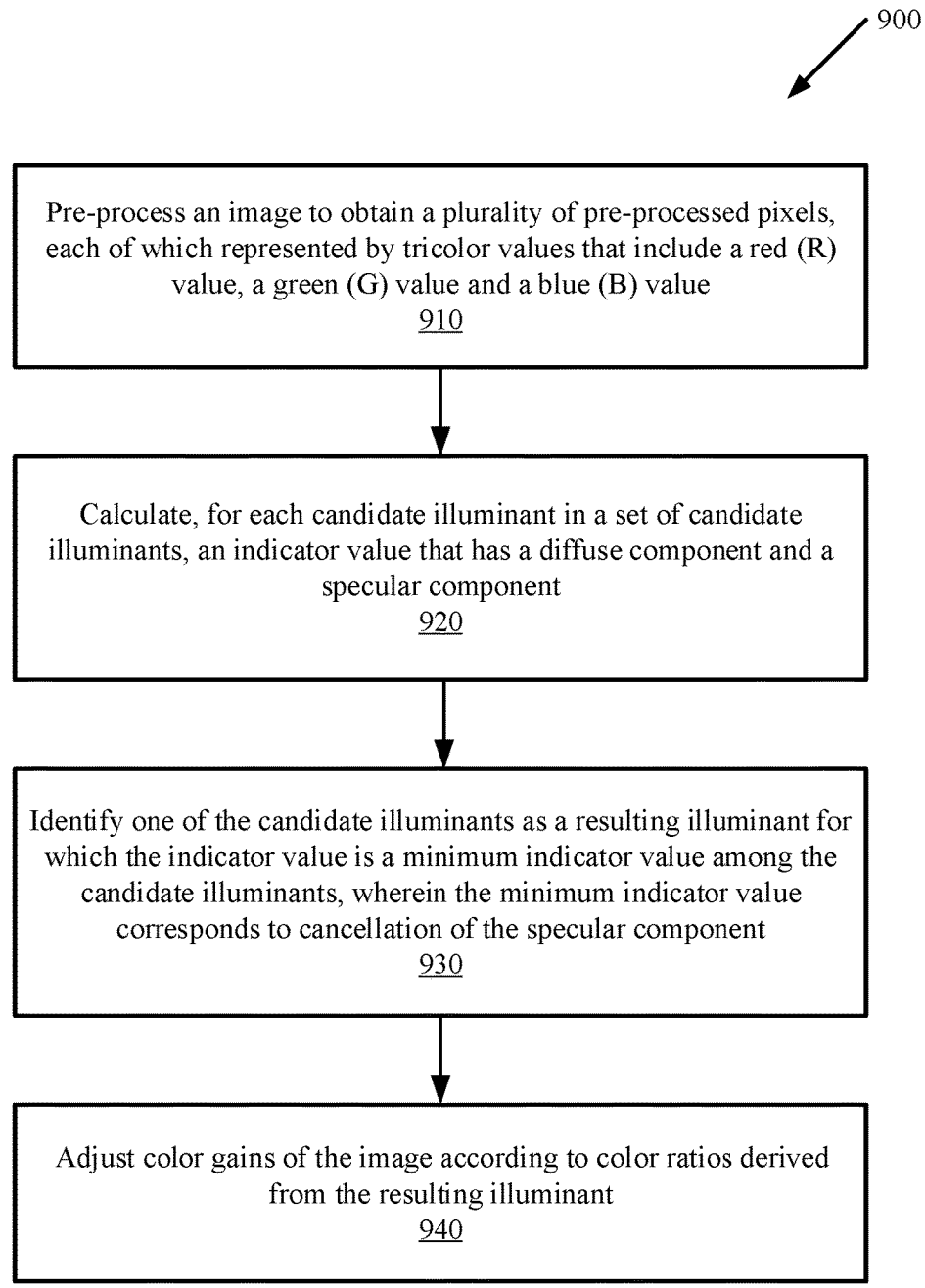
FIG. 9 is a flow diagram illustrating a method for automatic white balance according to one embodiment.

FIG. 9 is a flow diagram illustrating a method 900 for performing automatic white balance on an image according to one embodiment. The method 900 may be performed by a device, such as the device 150 of FIG. 1B; more specifically, the method 900 may be performed by the AWB module 110 of FIG. 1A, the AWB module 300 of FIG. 3, the AWB module 500 of FIG. 5, and/or the AWB module 700 of FIG. 7.

The method 900 begins with a device pre-processing the image to obtain a plurality of pre-processed pixels, each of which represented by tricolor values that include a red (R) value, a green (G) value and a blue (B) value (step 910). For each candidate illuminant in a set of candidate illuminants, the device calculates an indicator value that has a diffuse component and a specular component (step 920). The device then identifies one of the candidate illuminants as a resulting illuminant for which the indicator value is a minimum indicator value among the candidate illuminants, wherein the minimum indicator value corresponds to cancellation of the specular component (step 930). According to color ratios derived from the resulting illuminant, the device adjusts color gains of the image (step 940). In one embodiment, the indicator value is a projected area as described in connection with the MPA method 600 in FIG. 6; in alternative embodiments, the indicator value is a total variation as described in connection with the MTV method 800 in FIG. 8.

The operations of the flow diagrams of FIGS. 6, 8 and 9 have been described with reference to the exemplary embodiments of FIGS. 1A, 1B, 3, 5 and 7. However, it should be understood that the operations of the flow diagrams of FIGS. 6, 8 and 9 can be performed by embodiments of the invention other than the embodiments discussed with reference to FIGS. 1A, 1B, 3, 5 and 7, and the embodiments discussed with reference to FIGS. 1A, 1B, 3, 5 and 7 can perform operations different than those discussed with reference to the flow diagrams. While the flow diagrams of FIGS. 6, 8 and 9 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for performing automatic white balance on an image, comprising:
pre-processing the image to obtain a plurality of pre-processed pixels, each of which represented by tricolor values that include a red (R) value, a green (G) value and a blue (B) value;
calculating, for each candidate illuminant in a set of candidate illuminants, an indicator value that has a diffuse component and a specular component;
identifying one of the candidate illuminants as a resulting illuminant for which the indicator value is a minimum indicator value among the candidate illuminants, wherein the minimum indicator value corresponds to cancellation of the specular component; and
adjusting color gains of the image according to color ratios derived from the resulting illuminant.

2. The method of claim 1, wherein calculating the indicator value for each candidate illuminant further comprises:

calculating a projection plane perpendicular to a vector that represents tricolor values of the candidate illuminant; and projecting the tricolor values of each of the pre-processed pixels to the calculated projection plane to obtain a projected area as the indicator value.

3. The method of claim 2, further comprising:
dividing the image into multiple blocks;
identifying, for each block, a corresponding resulting illuminant; and
calculating the resulting illuminant based on all of corresponding resulting illuminants identified for the multiple blocks.

4. The method of claim 3, wherein the resulting illuminant is a weighted average of all of the corresponding resulting illuminants, or one of the corresponding resulting illuminants as a result of voting.

5. The method of claim 1, wherein the set of candidate illuminants are represented in a chromaticity space by a plurality of points that lie on a light locus generated from a population of known illuminants in an image database, or from a blending of loci that include at least a daylight locus and a blackbody radiator locus.

6. The method of claim 1, further comprising:
for each illuminant candidate, weighting the indicator value by a bias value associated with the illuminant candidate, wherein the bias value indicates a likelihood of the illuminant candidate being a true illuminant for the image.

7. The method of claim 1, wherein pre-processing the image further comprises:
dividing the image into a plurality of groups of neighboring pixels; and
calculating a weighted average of the tricolor values of the neighboring pixels in each group.

8. The method of claim 1, wherein pre-processing the image further comprises:
removing pixels in the image that are over-exposed, under-exposed or saturated.

9. The method of claim 8, wherein removing the pixels further comprises:
removing a pixel if one or more of following conditions are true:
one of the R value, the G value and the B value of the pixel is within a predetermined vicinity from a maximum of a color data range of the pixel;
a sum of the R value, the G value and the B value of the pixel is above a first threshold or below a second threshold; and
one of the R value, the G value and the B value of the pixel is below a third threshold.

10. The method of claim 1, wherein calculating the indicator value for each candidate illuminant further comprises:
calculating a total variation in the tricolor values between neighboring pixels of the pre-processed pixels as the indicator value, wherein calculating the total variation further comprises:
calculating a linear transformation of the tricolor values to obtain three transformed values;
calculating a first scaling factor and a second scaling factor, which represent two color ratios of the candidate illuminant;
constructing a first chroma image by taking a difference between a first transformed value scaled by the first scaling factor and a second transformed value;
constructing a second chroma image by taking a difference between a third transformed value scaled by the second scaling factor and the second transformed value; and
calculating the total variation by summing absolute gradient magnitudes of the first chroma image and absolute gradient magnitudes of the second chroma image.

11. A device for performing automatic white balance on an image, comprising:
a memory to store the image;
an image processing circuitry, which is coupled to the memory and is operative to:
pre-process the image to obtain a plurality of pre-processed pixels, each of which represented by tricolor values that include a red (R) value, a green (G) value and a blue (B) value;
calculate, for each candidate illuminant in a set of candidate illuminants, an indicator value that has a diffuse component and a specular component;
identify one of the candidate illuminants as a resulting illuminant for which the indicator value is a minimum indicator value among the candidate illuminants, wherein the minimum indicator value corresponds to cancellation of the specular component; and
adjust color gains of the image according to color ratios derived from the resulting illuminant; and
a display coupled to the image processing circuitry to display the image with the adjusted color gains.

12. The device of claim 11, wherein the image processing circuitry, when calculating the indicator value for each candidate illuminant, is further operative to:
calculate a projection plane perpendicular to a vector that represents tricolor values of the candidate illuminant; and
project the tricolor values of each of the pre-processed pixels to the calculated projection plane to obtain a projected area as the indicator value.

13. The device of claim 12, wherein the image processing circuitry is further operative to:
divide the image into multiple blocks;
identify, for each block, a corresponding resulting illuminant; and
calculate the resulting illuminant based on all of corresponding resulting illuminants identified for the multiple blocks.

14. The device of claim 13, wherein the resulting illuminant is a weighted average of all of the corresponding resulting illuminants, or one of the corresponding resulting illuminants as a result of voting.

15. The device of claim 11, wherein the set of candidate illuminants are represented in a chromaticity space by a plurality of points that lie on a light locus generated from a population of known illuminants in an image database, or from a blending of loci that include at least a daylight locus and a blackbody radiator locus.

16. The device of claim 11, wherein the image processing circuitry is further operative to:
for each illuminant candidate, weight the indicator value by a bias value associated with the illuminant candidate, wherein the bias value indicates a likelihood of the illuminant candidate being a true illuminant for the image.

17. The device of claim 11, wherein the image processing circuitry, when pre-processing the image, is further operative to:

divide the image into a plurality of groups of neighboring pixels; and calculate a weighted average of the tricolor values of the neighboring pixels in each group.

18. The device of claim 11, wherein the image processing circuitry, when pre-processing the image, is further operative to:

remove pixels in the image that are over-exposed, under-exposed or saturated.

19. The device of claim 18, wherein the image processing circuitry is further operative to:

remove a pixel if one or more of following conditions are true:

one of the R value, the G value and the B value of the pixel is within a predetermined vicinity from a maximum of a color data range of the pixel;

a sum of the R value, the G value and the B value of the pixel is above a first threshold or below a second threshold; and one of the R value, the G value and the B value of the pixel is below a third threshold.

20. The device of claim 11, wherein the image processing circuitry, when calculating the indicator value for each candidate illuminant, is further operative to:

calculate a total variation in the tricolor values between neighboring pixels of the processed pixels as the indicator value, wherein the image processing circuitry, when calculating the total variation, is further operative to:

calculate a linear transformation of the tricolor values to obtain three transformed values;

calculate a first scaling factor and a second scaling factor, which represent two color ratios of the candidate illuminant;

construct a first chroma image by taking a difference between a first transformed value scaled by the first scaling factor and a second transformed value;

construct a second chroma image by taking a difference between a third transformed value scaled by the second scaling factor and the second transformed value; and calculate the indicator value by summing absolute gradient magnitudes of the first chroma image and absolute gradient magnitudes of the second chroma image.

* * * * *